United States Patent [19]

Sekine

[11] Patent Number: 4,824,239
[45] Date of Patent: Apr. 25, 1989

[54] REFLECTION-TYPE OVERHEAD PROJECTOR

[75] Inventor: Takashi Sekine, Tokyo, Japan

[73] Assignee: Fuji Photo Film Co., Ltd., Kanagawa, Japan

[21] Appl. No.: 943,321

[22] Filed: Dec. 22, 1986

[30] Foreign Application Priority Data

Dec. 25, 1985 [JP] Japan ............................ 60-198336[U]

[51] Int. Cl.⁴ .............................................. G03B 21/06
[52] U.S. Cl. ......................................... 353/66; 353/57
[58] Field of Search ................... 353/DIG. 4, DIG. 6, 353/65–67, 85, 57; 362/376

[56] References Cited

U.S. PATENT DOCUMENTS

| | | | |
|---|---|---|---|
| 1,444,054 | 2/1923 | Benjamin | 362/376 |
| 1,474,401 | 11/1923 | Bramley | 362/376 X |
| 3,340,765 | 9/1967 | Herriott | 353/DIG. 4 X |
| 3,459,475 | 8/1969 | Lucas | 353/DIG. 4 X |
| 4,206,984 | 6/1980 | Mueller | 353/61 |

FOREIGN PATENT DOCUMENTS 3002105 9/1981 Fed. Rep. of Germany ........ 353/66

Primary Examiner—Harry N. Haroian
Attorney, Agent, or Firm—Young & Thompson

[57] ABSTRACT

A reflection-type overhead projector for projecting large transparencies onto a remote screen. The overhead projector has a base with a Fresnel mirror that serves as a stage on which a transparency to be projected is placed, and a lamp housing for a projection lens with an associated mirror which is supported on a pivotable arm above the base. The lamp housing is formed with an opening for allowing the passage of light to illuminate the transparency on the stage. This opening is fitted with a protective screen for guarding the fingers from the heated illumination lamp.

2 Claims, 2 Drawing Sheets

REFLECTION-TYPE OVERHEAD PROJECTOR

BACKGROUND OF THE INVENTION

The present invention relates to a reflection-type overhead projector, and particularly to a reflection-type overhead projector wherein the safety and heat dissipation of a projection head are ensured.

Reflection-type overhead projectors for projecting large transparencies onto a remote screen in a lighted room usually comprise a projection head, a base having a Fresnel mirror used as a stage, and an arm on which the projection head is supported above the base. The projection head has a lamp housing wherein are an illumination lamp, and a projection lens with its associated mirror or prism for projecting an image of the transparency placed on the Fresnel mirror onto the remote screen. During projection, the transparency is placed directly on the Fresnel mirror and illuminated from the upper side thereof by the illumination lamp. The light, after having been transmitted through the transparency, is reflected upward by the Fresnel mirror so as to transmit again the image of the transparency. The projection lens and its associated mirror form an image on the remote screen.

The above-described reflection-type overhead projector usually has the lamp housing formed with a transparent window at its bottom fitted with a transparent glass plate through which the lamp illuminates a transparency placed on the stage. Because of the requirement of illumination light of strong intensity, the lamp usually generates a great deal of heat. The lamp housing prevents this heat from escaping, and so becomes quite hot. In particular, the transparent glass plate, which is directly illuminated by the lamp, attains a surface temperature between 160° C. and 270° C.

There is known a lamp housing which is formed with an opening at the bottom in place of the transparent window fitted with a glass plate. This open-bottomed lamp housing allows easy access of the operator's fingers to the inside thereof, which is hot during and just after the use of the overhead projector. Therefore, there is a danger that the lamp will be touched directly by the operator's fingers and that he will thus burn his fingers.

OBJECTS OF THE INVENTION

It is therefore an object of the present invention to provide a reflection-type overhead projector which is safer to operate than the conventional reflection-type overhead projectors.

It is another object of the present invention to provide a reflection-type overhead projector which has improved heat dissipation.

SUMMARY OF THE INVENTION

In accordance with the invention, a reflection-type overhead projector is provided in which a lamp housing at its bottom is formed with an opening for allowing illumination light to pass therethrough. This opening is fitted with a protective screen comprising a wire or glass fiber net. The provision of this screen avoids the danger of burning the operator's fingers. Not only does it permit effective heat dissipation, but also it has no adverse effect on the projecting optical system.

As a feature of the present invention, the protective screen is constructed by net of thin wire or glass fibers so as to prevent the reduction of light intensity. If a wire of high thermal conductivity is used, the protective screen itself undergoes little temperature rise.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
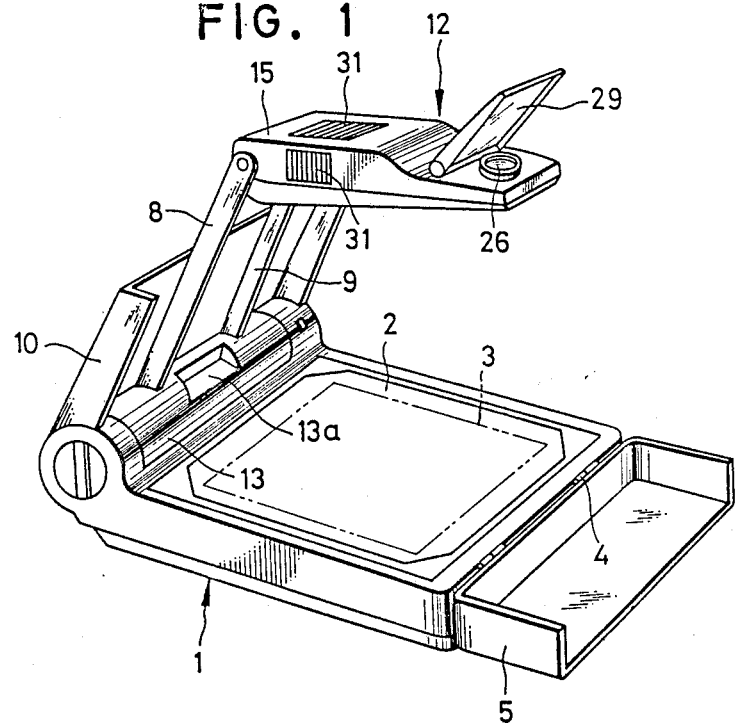
FIG. 1 is a perspective view showing the reflection-type overhead projector of the present invention.

Referring now to FIG. 1, shown therein is the reflection-type overhead projector of a preferred embodiment of the present invention which has a box-shaped base 1 that includes a Fresnel mirror 2 forming a portion of a stage on which is placed a transparency 3 to be projected.

At the rear of the stage 1 is a supporting member comprising a pair of erected arms 8, 9 which are so disposed as to provide a space therebetween and can be pushed down to the horizontal position. At the upper end of the arms 8, 9 is a projection head 12 mounted thereon for pivotal movement so as to be positionable substantially parallel to the base 1. The projection head 12, which is held in the operative position by means of any well known click stop mechanism (not shown), can be pushed down into the space between the arms 8, 9. The front end of the thus-retracted projection head 12 is seated in a recessed section 13a of a rotatable axle 13 firmly supporting the arms 8, 9.

There is provided a double-leafed hinged door comprising a half door 5 adapted to open on a hinge 4 and another half door 10 attached to the back of the arms 8, 9. Doors 5 and 10 can be closed to cover the projection head 12 disposed between the arms 8, 9 when the latter are pushed down.

Figure 2:
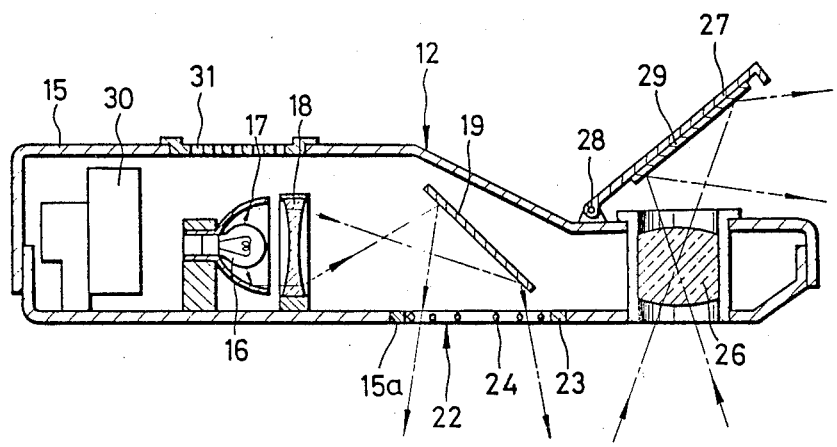
FIG. 2 is an enlarged cross-sectional view showing the construction of the projection head of the reflection-type overhead projector shown in FIG. 1.

As shown in detail in FIG. 2, the projection head 12 has a lamp housing 15 containing a lamp 16 capable of emitting light of strong intensity in cooperation with its associated reflecting mirror 17 and a condenser lens 18 that project the light forward. There is provided in the lamp housing 15 a mirror 19 inclined at about 45°, that reflects the projected light downward, namely to the Fresnel mirror 2.

Figure 3:
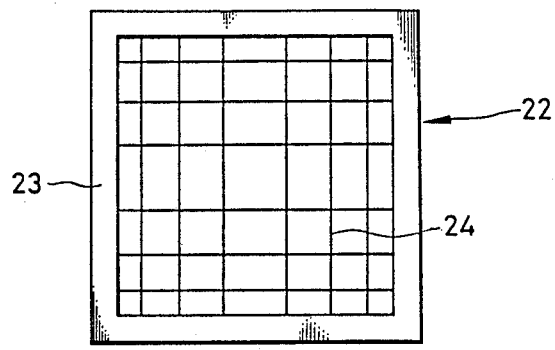
FIGS. 3 and 4 are views of two different protective screens used alternatively with the reflection-type overhead projector shown in FIGS. 1 and 2.

At the bottom of the lamp housing 15, there is an opening 15a formed below the mirror 19 in which a protective screen 22 is fitted for safety. As shown in FIG. 3, the protective screen 22 comprises a wire net or meshes 24 installed in a frame 23. The wire net 24 is made of thin wire or glass fiber extending lengthwise and crosswise. This protective screen 22 can prevent not only easy access to the inside of the lamp house 15 but also the reduction of intensity of the reflected light from the mirror 19. It should be noted that the central openings of the wire net 24 are a little larger than the peripheral openings, so as to minimize the reduction of the projected light passing through the central part of the wire net 24.

In the lamp housing 15 there is a projection lens 26 which projects a magnified image of the transparency 3 placed on the base 1 to a remote screen (not shown) well known in the art. Mounted on the lamp housing 15 by a hinge 28 is a holding means 27 supporting a mirror 29 associated with the projection lens 26 so as to reflect the projected image at a right angle toward the remote screen. There is also provided in the lamp housing 15 a cooling fan 30 with its associated draft slits 31.

When using the reflection-type overhead projector of the present invention, the projection head 12 is positioned as is shown in FIG. 1. Light emitted from the lamp 16 is projected by condenser lens 18 and then reflected downward by the mirror 19, illuminating the transparency 3 on the stage of the base 1 to transmit light therethrough. This transmitted light is reflected by the Fresnel mirror 2 to illuminate the transparency 3 from the underside thereof. The light transmitted through the transparency 3 is directed by the projection lens 26 with its associated mirror 29 to the remote screen (not shown) so as to project a magnified image of the transparency 3 onto the remote screen.

Although during the projection of the transparency the illumination of the lamp 16 will be accompanied by a considerable evolution of heat, the cooling fan 30 blows air, cooling the lamp 16 and the mirror 19. The protective screen 22 permits the fan draft to cool efficiently the inside of the lamp housing 15, and also prevents the fingers of an operator from entering the lamp housing 15 and being burned. The wire net 24, which itself will be heated by the light, will also be cooled by the air flow passing therethrough.

After use, the reflection-type overhead projector can be collapsed. To collapse it, the projection head 12 is pushed down between the arms 8, 9 after the mirror holder 27 has been pushed down. Then the arms 8, 9 are pushed down against the Fresnel mirror 2. The half door 5 is swung closed over half of the base 1, and other half door 10 having swung closed with the arms 8, 9. The double-leafed hinged door thus imparts to the collapsed overhead projector a compact box shape for convenience of carrying and storage.

Figure 4:
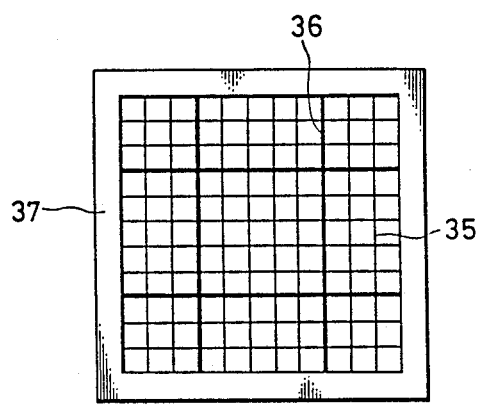

FIG. 4 shows another example of the protective screen which is of particular advantage in applications wherein it is necessary to distribute the illumination light uniformly over the stage. For this purpose, the protective screen is a net of uniformly sized meshes woven from thin wire. However, the thin wire is weak, and so the net, whose major part woven from thin wire 35 of diameter about 0.1-0.3 mm, is reinforced with several relatively thick wires 36 of diameter about 0.5-1.0 mm. The net, whose meshes are of uniform size are woven from these thin and thick wires 35 and 36, is attached to and supported within a frame 37.

While representative embodiments of the invention have been described and illustrated, those skilled in the art will recognize that many variations and modifications of such embodiments may be made without departing from the spirit of the invention; and it is intended to claim all such variations and modifications as fall within the true scope of the invention.

What is claimed is:

1. In a reflection-type overhead projector for projecting a transparency onto a remote screen comprising
    base means having a Fresnel mirror on which said transparency to be projected is placed,
    a projection head having a housing for an illuminating light source and a projection lens,
    supporting means for supporting thereon said projection head above said base,
    there being an opening through the bottom of said housing for allowing light from said source to illuminate said transparency and be reflected by said mirror through said projection lens to a said remote screen;
    the improvement comprising a protective screen fitted in said opening for the prevention of easy access to the inside of said housing, said screen having meshes which are centrally large and peripherally smaller.

2. In a reflection-type overhead projector for projecting a transparency onto a remote screen comprising
    base means having a Fresnel mirror on which said transparency to be projected is placed,
    a projection head having a housing for an illuminating light source and a projection lens,
    supporting means for supporting thereon said projection head above said base,
    there being an opening through the bottom of said housing for allowing light from said source to illuminate said transparency and be reflected by said mirror through said projection lens to a said remote screen;
    the improvement comprising a protective screen fitted in said opening for the prevention of easy access to the inside of said housing, said screen having meshes defined by thin and thick wires, said meshes being of uniform size and said thin wires being more plentiful than said thick wires.

* * * * *